US011223567B2

(12) United States Patent
Warnicke et al.

(10) Patent No.: US 11,223,567 B2
(45) Date of Patent: Jan. 11, 2022

(54) TRANSMISSION CONTROL PROTOCOL SESSION MOBILITY

(71) Applicant: Cisco Technology, Inc., San Jose, CA (US)

(72) Inventors: Edward A. Warnicke, Austin, TX (US); William Mark Townsley, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/251,625

(22) Filed: Jan. 18, 2019

(65) Prior Publication Data
US 2020/0236055 A1    Jul. 23, 2020

(51) Int. Cl.
*H04L 12/801* (2013.01)
*H04L 29/06* (2006.01)
(Continued)

(52) U.S. Cl.
CPC .......... *H04L 47/193* (2013.01); *H04L 47/27* (2013.01); *H04L 47/34* (2013.01); *H04L 49/70* (2013.01);
(Continued)

(58) Field of Classification Search
CPC ....... H04L 47/193; H04L 47/27; H04L 47/34; H04L 49/70; H04L 65/105; H04L 67/142; H04L 69/163
(Continued)

(56) References Cited

U.S. PATENT DOCUMENTS 8,032,641 B2   10/2011   Li et al.
8,706,877 B2    4/2014   Sundarrajan et al.
(Continued)

OTHER PUBLICATIONS

Yoann Desmouceaux et al., "6LB: Scalable and Application-Aware Load Balancing with Segment Routing", https://www.researchgate.net/publication/323207922, Feb. 2018, 17 pages.
(Continued)

*Primary Examiner* — Nicholas R Taylor
*Assistant Examiner* — Chong G Kim
(74) *Attorney, Agent, or Firm* — Edell Shapiro & Finnan, LLC (57) ABSTRACT

A first node in a service mesh is configured to perform one or more services on network traffic obtained from an upstream network element via a pre-existing Transmission Control Protocol (TCP) session and provide the network traffic obtained from the upstream network element via the pre-existing TCP session to a downstream network element. The first node determines that the first node should no longer obtain the network traffic from the upstream network element via the pre-existing TCP session. In response, the first node provides state information for the pre-existing TCP session to the downstream network element. The downstream network element is configured to establish a new TCP session having the state information for the pre-existing TCP session with the upstream network element and to obtain further network traffic from the upstream network element via the new TCP session. The first node terminates the pre-existing TCP session.

20 Claims, 5 Drawing Sheets

(51) Int. Cl.
*H04L 12/931* (2013.01)
*H04L 12/807* (2013.01)
*H04L 29/08* (2006.01)

(52) U.S. Cl.
CPC .......... *H04L 65/105* (2013.01); *H04L 67/142* (2013.01); *H04L 69/163* (2013.01)

(58) Field of Classification Search
USPC ........................................................ 709/238
See application file for complete search history.

(56) References Cited

U.S. PATENT DOCUMENTS

| | | | |
|---|---|---|---|
| 9,584,415 B2* | 2/2017 | Chu | H04L 45/64 |
| 9,712,434 B2* | 7/2017 | Ashwood-Smith | H04L 47/32 |
| 9,985,872 B2* | 5/2018 | Jaffer | H04L 45/22 |
| 10,412,159 B1* | 9/2019 | McCullagh | H04L 67/1038 |
| 2003/0023767 A1* | 1/2003 | Brabson | H04L 67/1014 |
| | | | 719/313 |
| 2006/0215548 A1* | 9/2006 | Le Faucheur | H04L 45/22 |
| | | | 370/228 |
| 2008/0235382 A1* | 9/2008 | Marwah | H04L 67/1023 |
| | | | 709/228 |
| 2011/0032821 A1* | 2/2011 | Morrill | H04L 12/6418 |
| | | | 370/230 |
| 2012/0099601 A1* | 4/2012 | Haddad | H04L 29/12405 |
| | | | 370/401 |
| 2012/0239725 A1* | 9/2012 | Hartrick | H04L 69/163 |
| | | | 709/203 |
| 2013/0083799 A1* | 4/2013 | Xie | H04L 47/34 |
| | | | 370/394 |
| 2013/0238759 A1* | 9/2013 | Ostrowski | H04L 61/6013 |
| | | | 709/219 |
| 2014/0095592 A1* | 4/2014 | Hartrick | H04L 47/767 |
| | | | 709/203 |
| 2015/0003283 A1* | 1/2015 | Previdi | H04L 41/12 |
| | | | 370/254 |
| 2016/0099864 A1* | 4/2016 | Akiya | H04L 45/28 |
| | | | 370/216 |
| 2016/0173366 A1* | 6/2016 | Saad | H04L 45/22 |
| | | | 370/218 |
| 2017/0026224 A1 | 1/2017 | Townsley et al. | |
| 2017/0054640 A1* | 2/2017 | Xue | H04L 1/1671 |
| 2017/0093732 A1* | 3/2017 | Mohammadi | H04L 45/74 |
| 2018/0097891 A1* | 4/2018 | Calo | H04L 45/24 |
| 2018/0219783 A1* | 8/2018 | Pfister | H04L 45/34 |
| 2018/0278531 A1* | 9/2018 | Zhuang | H04L 47/825 |
| 2019/0199642 A1* | 6/2019 | Jiang | H04L 43/12 |
| 2020/0358857 A1* | 11/2020 | Yang | H04L 67/2819 |

OTHER PUBLICATIONS

C. Filsfils et al., "SRv6 Network Programming draft-filsfils-spring-srv6-network-programming-03", Dec. 21, 2017, 53 pages.

Fabien Duchene et al., "SRv6Pipes: enabling in-network bytestream functions", ISBN 978-3-903176-08-9, downloaded Dec. 14, 2018, 9 pages.

* cited by examiner

FIG.1

| SOURCE IP ADDRESS | DESTINATION IP ADDRESS | PROTOCOL | SOURCE PORT | DESTINATION PORT | NEXT HOPS |
|---|---|---|---|---|---|
| * | ServicePrefix:: | * | * | * | Node125(1)::...Node125(N)::(ECMP) |
| Client105::1 | ServicePrefix:: | TCP | 1234 | 80 | Pod130(2)::1 |

TRANSMISSION CONTROL PROTOCOL SESSION MOBILITY

TECHNICAL FIELD

The present disclosure relates to service meshes.

BACKGROUND

A service mesh includes a plurality of service proxies, each of which provides one or more services (e.g., microservices) to network traffic. A service mesh can provide service proxy routes for network traffic based on Layer 7 (L7) information (e.g., HyperText Transfer Protocol (HTTP) headers, Uniform Resource Locators (URLs), cookies, etc.). For example, a client can make a request to a service proxy, which will look up L7 information and decide whether the network traffic needs to be sent to another service proxy or to the destination.

DESCRIPTION OF EXAMPLE EMBODIMENTS

Overview

In one embodiment, a first node in a service mesh is configured to perform one or more services on network traffic obtained from an upstream network element via a pre-existing Transmission Control Protocol (TCP) session and provide the network traffic obtained from the upstream network element via the pre-existing TCP session to a downstream network element. The first node determines that the first node should no longer obtain the network traffic from the upstream network element via the pre-existing TCP session. In response to determining that the first node should no longer obtain the network traffic from the upstream network element via the pre-existing TCP session, the first node provides state information for the pre-existing TCP session to the downstream network element. The downstream network element is configured to establish a new TCP session having the state information for the pre-existing TCP session with the upstream network element and to obtain further network traffic from the upstream network element via the new TCP session. The first node terminates the pre-existing TCP session.

Example Embodiments

Figure 1:
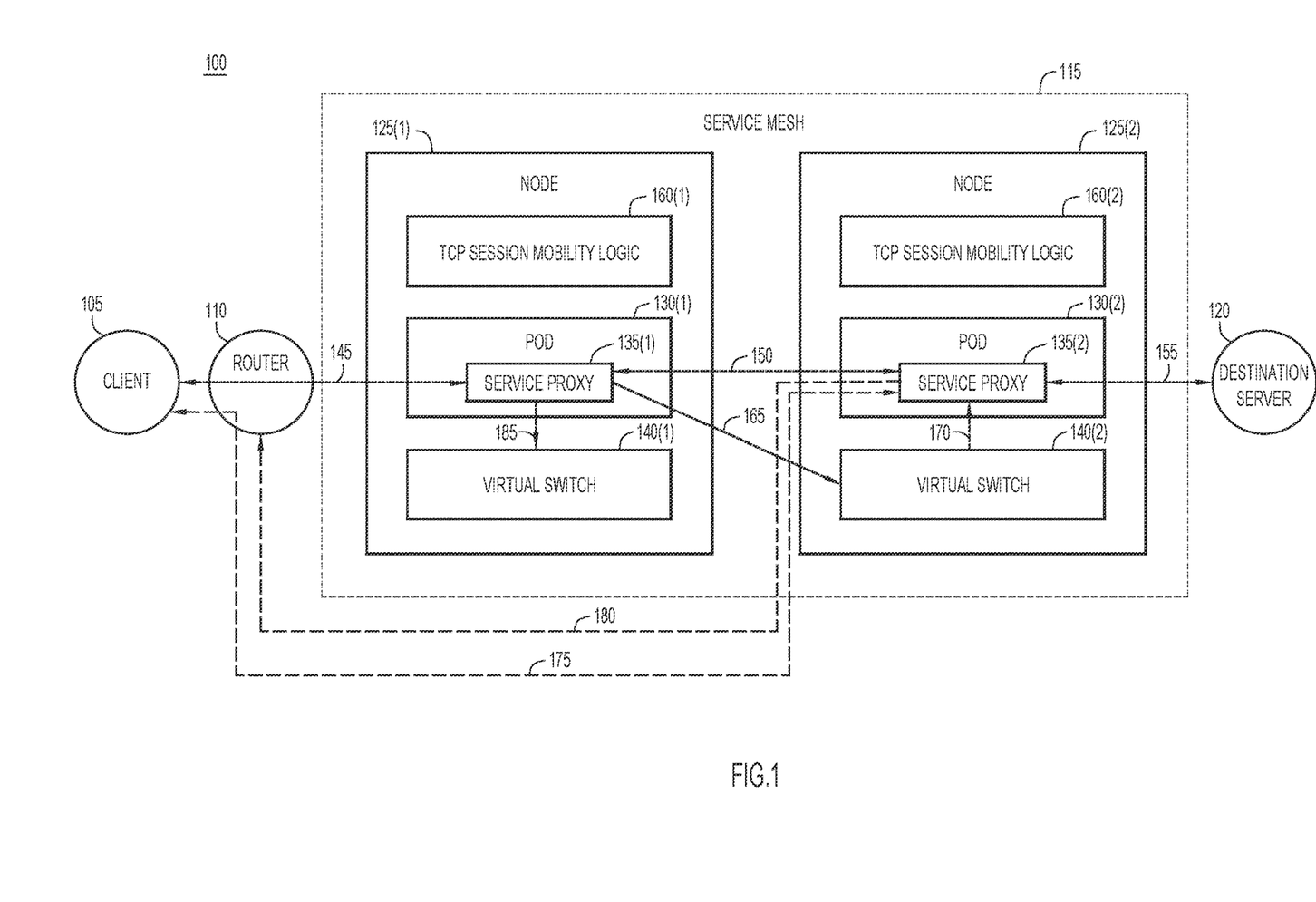
FIG. 1 illustrates a system that moves a Transmission Control Protocol (TCP) session from a first node to a second node, according to an example embodiment.

FIG. 1 illustrates an example system 100 that moves a Transmission Control Protocol (TCP) session. System 100 includes client device 105, router 110, service mesh 115, and destination server 120. Service mesh 115 includes nodes 125(1) and 125(2). Node 125(1) includes pod 130(1), which includes service proxy 135(1), and virtual switch 140(1). Similarly, node 125(2) includes pod 130(2), which includes service proxy 135(2), and virtual switch 140(2). Client device 105 is upstream of router 110, router 110 is upstream of node 125(1), node 125(1) is upstream of node 125(2), and node 125(2) is upstream of destination server 120. Conversely, destination server 120 is downstream of node 125(2), node 125(2) is downstream of node 125(1), node 125(1) is downstream of router 110, and router 110 is downstream of client device 105.

Although two nodes 125(1) and 125(2) are depicted in service mesh 115, it will be appreciated that service mesh 115 may include any suitable number of nodes. Nodes 125(1) and 125(2) may be virtual nodes, and may be implemented on the same physical server, respective physical servers, or distributed among multiple physical servers. Node 125(1) is configured to perform one or more services on network traffic obtained from router 110 via pre-existing TCP session 145 and provide the network traffic obtained from router 110 via pre-existing TCP session 145 to node 125(2). Node 125(2) is configured to perform one or more services on the network traffic obtained from node 125(1) via pre-existing TCP session 150 and provide the network traffic obtained from node 125(1) via pre-existing TCP session 150 to destination server 120. Destination server obtains the network traffic from node 125(2) via pre-existing TCP session 155.

In this example, node 125(1) determines that node 125(1) should no longer obtain the network traffic from router 110 via pre-existing TCP session 145. For example, Layer 7 information of the network traffic may change to indicate that the network traffic no longer requires the service(s) provided by node 125(1). Conventionally, node 125(1) would thereafter obtain the network traffic from router 110 and provide the network traffic to node 125(2) without providing any services for (e.g., performing any operations on) the network traffic. Allowing node 125(1) to hairpin network traffic in this manner introduces unnecessary throughput and latency overhead, end-to-end congestion, and resource utilization into service mesh 115.

As such, in order to improve the performance of service mesh 115, node 125(1) is provided with TCP session mobility logic 160(1). TCP session mobility logic 160(1) enables node 125(1) to perform operations described herein. In particular, in response to determining that node 125(1) should no longer obtain the network traffic from router 110 via pre-existing TCP session 145, node 125(1) may provide state information for pre-existing TCP session 145 to node 125(2), as represented by arrow 165. For example, service proxy 135(1) may provide, to virtual switch 140(2), the state information for pre-existing TCP session 145. Upon receiving the state information for pre-existing TCP session 145, virtual switch 140(2) initiates a TCP three-way handshake with the end TCP network function at virtual switch 140(1). Virtual switch 140(2) is thereby configured to send/receive the network traffic.

As represented by arrow 170, virtual switch 140(2) provides the state information for pre-existing TCP session 145 to service proxy 135(2). In an alternative embodiment, service proxy 135(2) may receive the state information for pre-existing TCP session 145 directly from service proxy 135(1) (instead of through virtual switch 140(2)). This would result in service proxy 135(2) providing an indication to virtual switch 140(2). In any event, node 125(2) may establish new TCP session 175 having the state information for pre-existing TCP session 145. For example, service proxy 135(2) may bootstrap new TCP session 175 or repurpose the socket of pre-existing TCP session 150.

At this point, router 110 is still configured to provide the network traffic obtained from client device 105 to node 125(1) via pre-existing TCP session 145. Accordingly, node 125(2) may provide, to router 110, an indication to provide the network traffic obtained from client device 105 to node 125(2) via new TCP session 175, as represented by arrow 180. Node 125(2) may obtain further network traffic from router 110 via new TCP session 175, and node 125(1) may terminate pre-existing TCP session 145. In one example, node 125(2) may also terminate pre-existing TCP session 150. Thus, client device 105 now provides further network traffic directly to node 125(2) via new TCP session 175, thereby avoiding node 125(1) and improving performance of service mesh 115. From the perspective of client device 105, there may be no change to pre-existing TCP session 145.

As represented by arrow 185, service proxy 135(1) provides, to virtual switch 140(1), an indication to provide any of the network traffic obtained from router 110 via pre-existing TCP session 145 to node 125(2) before terminating pre-existing TCP session 145. Until service mesh 115 converges on re-forwarding further network traffic via new TCP connection 175 to node 125(2), virtual switch 140(1) may use a Segment Routing (SR) tunnel to pod 130(2) to forward any such further network traffic received at node 125(1). Virtual switch 140(1) may perform Network Address Translation (NAT) or encapsulation operations to forward such further network traffic. Since the stack state is no longer implemented on node 125(1), having been migrated to node 125(2), this may be done at Layer 3 (L3). It will be appreciated that operations 165, 170, and 185 may occur in any suitable sequence (e.g., operations 165 and 185 may occur simultaneously (or nearly simultaneously), followed by operation 170).

Client device 105 expects network traffic to match the state information for pre-existing TCP session 145 and, as such, network traffic that does not have the state information for pre-existing TCP session 145 may be dropped. State information may include a TCP sequence number and/or a TCP window size. In a further example, the state information includes the source Internet Protocol (IP) address (e.g., the IP address of client 105), the destination IP address (e.g., the IP address of destination server 120), the IP address of the receiving pod (e.g., pod 130(2)), flags indicating the TCP sequence number and/or TCP window size, source port(s), and destination port(s).

In one example, node 125(1) provides the state information for pre-existing TCP session 145 as in-band information in one or more headers of the network traffic obtained from router 110 via pre-existing TCP session 145. In a Segment Routing for IPv6 (SRv6) context, node 125(1) may insert a Segment Routing Header (SRH) including an ordered list of Segment Identifiers (SIDs) including a SID encoding the state information for pre-existing TCP session 145. Additionally/alternatively, the source port, destination port, TCP sequence number, and/or TCP window size may be communicated in the TCP header of the network traffic.

Node 125(1) may provide the state information for pre-existing TCP session 145 in any network context. The encoding of the state information may occur below the TCP level in the network stack so that the session routing becomes essentially a per-packet L3 action versus a Layer 4 (L4) proxy. While SRv6 allows for efficient encoding of information, any other tunnel or shim header that is not a part of TCP may be used. This ensures that pre-existing TCP session 145 does not have to be modified. Providing the state information for pre-existing TCP session 145 in-band avoids introducing independent control messages, and enables zero packet loss in many or most cases as there is less opportunity for race-condition induced packet loss.

Figure 2:
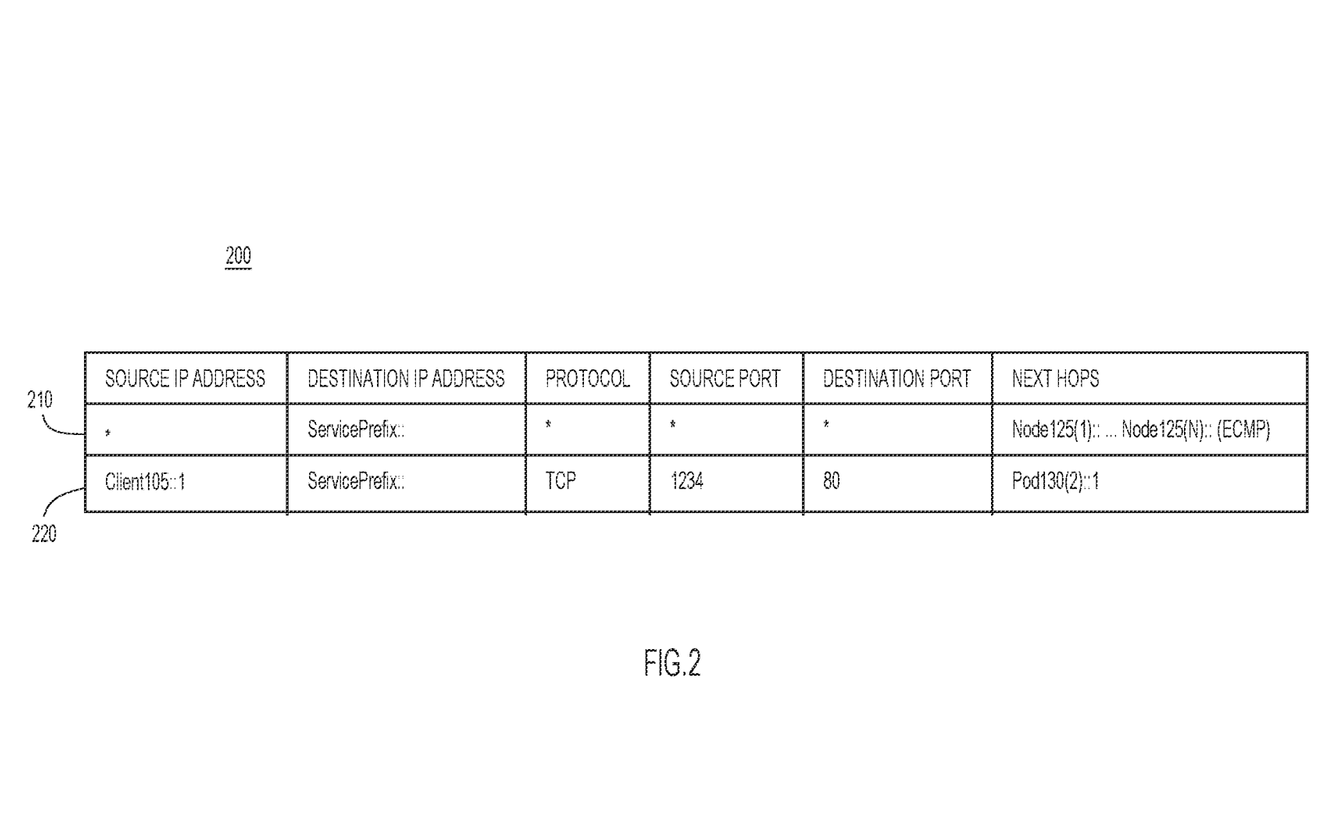
FIG. 2 illustrates a portion of a routing table indicating that a router is to provide network traffic to the second node, according to an example embodiment.

FIG. 2 illustrates a portion of a routing table 200 of router 110. Initially, routing table 200 includes row 210, which indicates that router 110 is to provide network traffic to one or more of nodes 125(1)-125(N) based on Equal-Cost Multi-Path (ECMP) routing. Upon receiving indication 180, router 110 updates routing table 200 with row 220, which indicates that router 110 is to provide further network traffic obtained from client device 105 directly to pod 130(2) (in node 125(2)). Row 220 specifies the protocol by which the further network traffic is to be transmitted (i.e., TCP), as well as the source port (i.e., 1234) and destination port (i.e., 80). Based on row 220, router 110 may thereafter provide the further network traffic to node 125(2).

Figure 3:
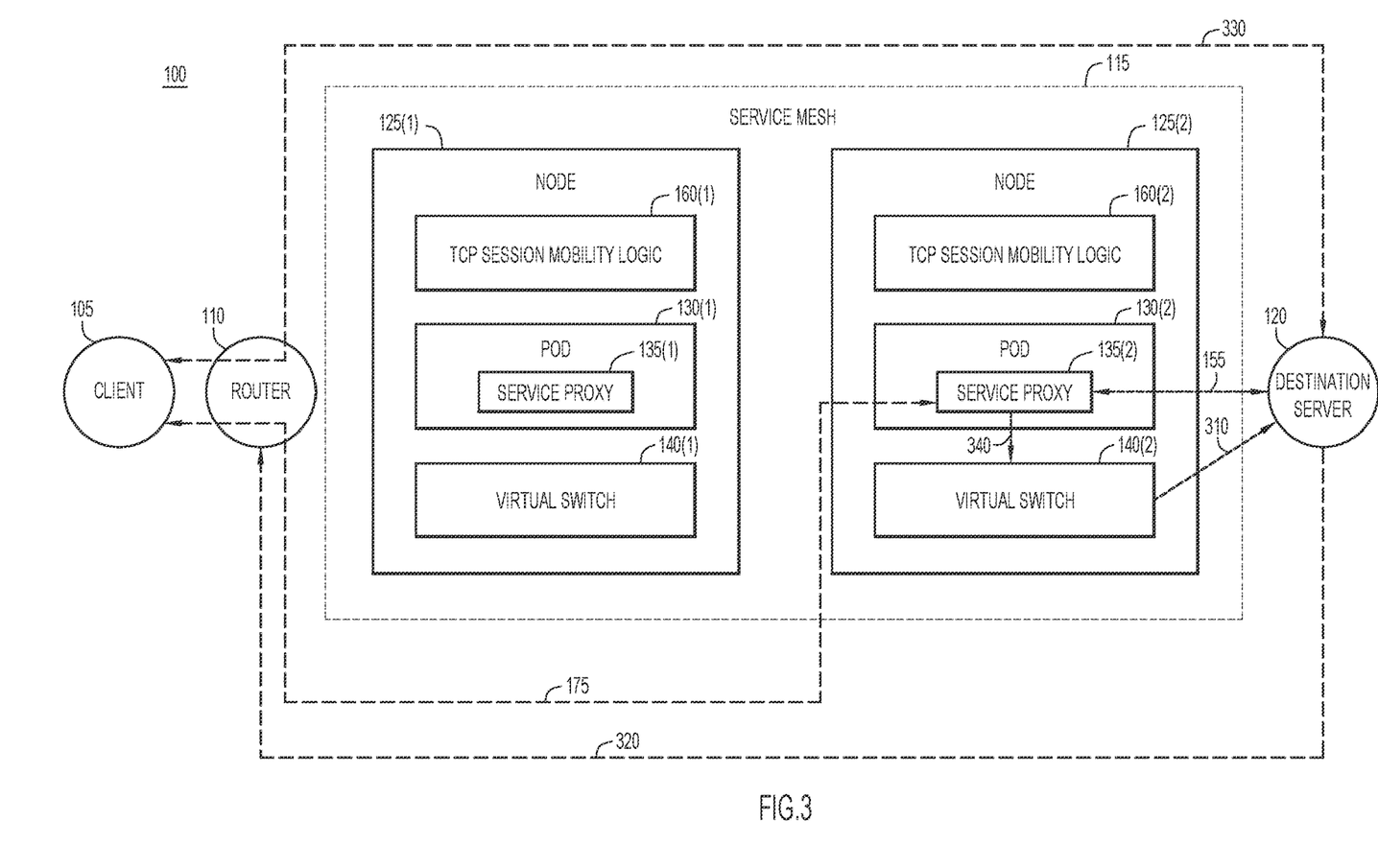
FIG. 3 illustrates the system of FIG. 1 at a subsequent point in time where the system moves the TCP session from the second node to a destination server, according to an example embodiment.

FIG. 3 illustrates system 100 at a subsequent point in time. TCP session 175 is no longer new and will be referred to hereafter as "pre-existing TCP session 175". Node 125(2) determines that node 125(2) should no longer obtain the network traffic from router 110 via pre-existing TCP session 175. For example, Layer 7 information of the network traffic may change to indicate that the network traffic no longer requires the service(s) provided by node 125(2). Conventionally, node 125(2) would thereafter obtain the network traffic from router 110 and provide the network traffic to destination server 120 without providing any services for (e.g., performing any operations on) the network traffic. However, allowing node 125(2) to hairpin network traffic in this manner introduces unnecessary throughput and latency overhead, end-to-end congestion, and resource utilization into service mesh 115.

As such, in order to improve the performance of service mesh 115, node 125(2) is provided with TCP session mobility logic 160(2). TCP session mobility logic 160(2) enables node 125(2) to perform operations described herein. In particular, in response to determining that node 125(2) should no longer obtain the network traffic from router 110 via pre-existing TCP session 175, node 125(2) may provide state information for pre-existing TCP session 175 to destination server 120, as represented by arrow 310. For example, service proxy 135(2) may provide, to destination server 120, the state information for pre-existing TCP session 175.

At this point, router 110 is still configured to provide the network traffic obtained from client device 105 to node 125(2) via pre-existing TCP session 175. Accordingly, as represented by arrow 320, destination server 120 may provide, to router 110, an indication to provide the network traffic obtained from client device 105 to destination server 120 via new TCP session 330. Router 110 may update routing table 220 in a similar manner as described with reference to FIG. 2 above. Destination server 120 may obtain further network traffic from router 110 via new TCP session 330, and node 125(2) may terminate pre-existing TCP session 175. In one example, destination server 120 may also terminate pre-existing TCP session 155. Thus, client device 105 now provides further network traffic directly to destination server 120 via new TCP session 330, thereby avoiding node 125(2) and improving performance of service mesh 115. From the perspective of client device 105, there may be no change to pre-existing TCP session 175.

As represented by arrow 340, service proxy 135(2) provides, to virtual switch 140(2), an indication to provide any of the network traffic obtained from router 110 via pre-existing TCP session 175 to destination server 120 before terminating pre-existing TCP session 175. Until service mesh 115 converges on re-forwarding further network traffic via new TCP connection 330 to destination server 120, virtual switch 140(2) may use an SR tunnel to destination server 120 to forward any such further network traffic received at node 125(2). Virtual switch 140(2) may perform NAT or encapsulation operations to forward such further network traffic. Since the stack state is no longer implemented on node 125(2), having been migrated to destination server 120, this may be done at L3.

In one example, if it is possible to impose a TCP bootstrap on destination server 120, new TCP session 330 runs end-to-end with only NAT functions at nodes 125(1) and 125(2). If destination server 120 does not permit a TCP session to be reset, node 125(2) may instead perform a TCP NAT function (e.g., TCP sequence number fixup). This is possible, but may be sufficiently complicated that it would be worth keeping service proxy 135(2) alive. Although the examples in FIGS. 1 and 2 illustrate this mechanism for nodes 125(1) and 125(2), the mechanism may be extended generally to N nodes/service proxies configured to allow a TCP session to be created/repurposed.

Figure 4:
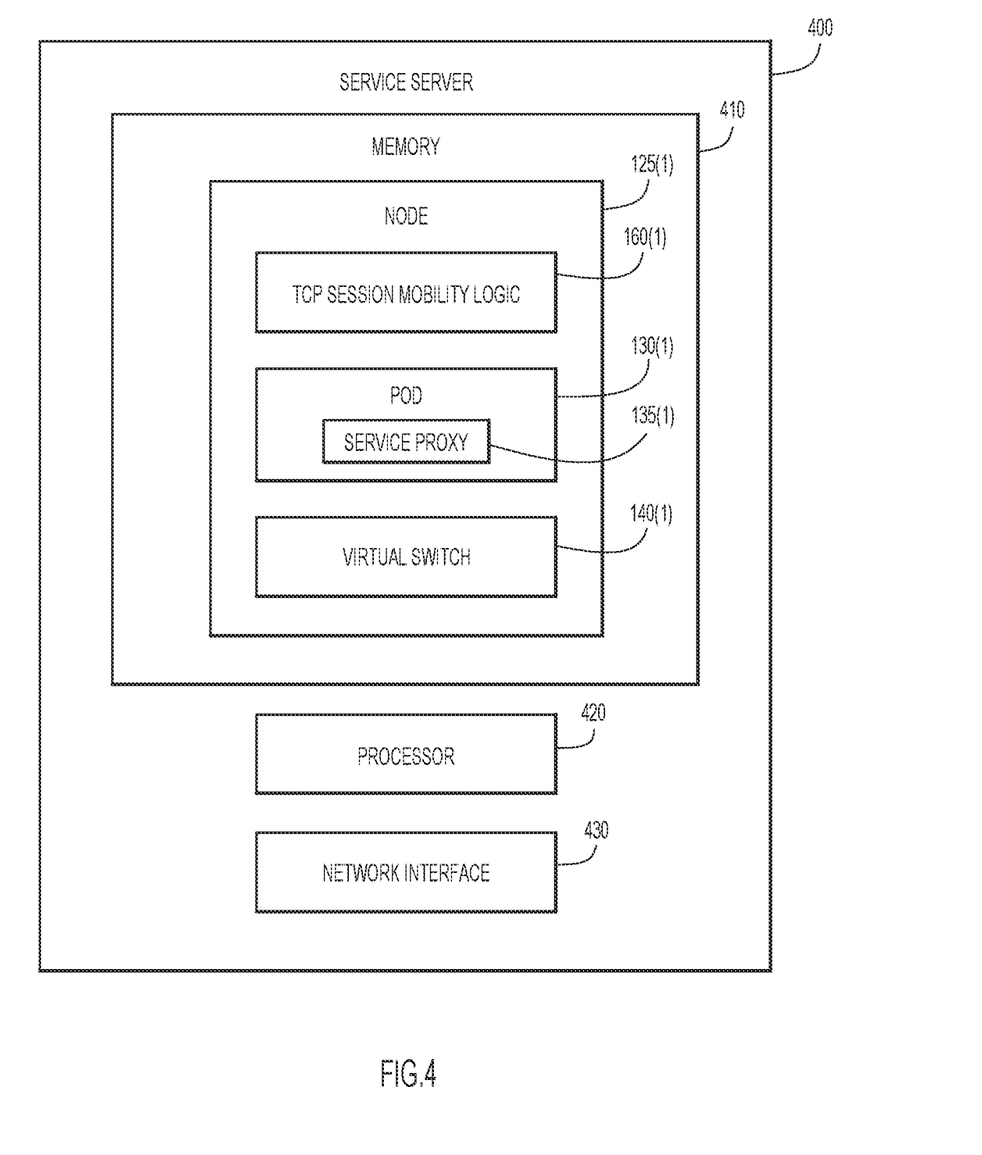
FIG. 4 is a block diagram of a computing device configured to move a TCP session, according to an example embodiment.

FIG. 4 is a simplified block diagram of service server 400 configured to implement the techniques presented herein. In this example, service server 400 includes memory 410 that stores (virtual) node 125(1) (including instructions for TCP session mobility logic 160(1)), one or more processors 420, and network interface 430. One or more processors 420 are configured to execute instructions stored in the memory 410 for TCP session mobility logic 160(1). When executed by the one or more processors 420, TCP session mobility logic 160(1) causes service server 400 to perform the operations described herein. Network interface 430 is a network interface card (or multiple instances of such a device) or another network interface device that enables network communications on behalf of service server 400 for sending and receiving messages as described above.

Memory 410 may be read only memory (ROM), random access memory (RAM), magnetic disk storage media devices, optical storage media devices, flash memory devices, electrical, optical, or other physical/tangible memory storage devices. Thus, in general, memory 410 may be one or more tangible (non-transitory) computer readable storage media (e.g., a memory device) encoded with software comprising computer executable instructions and when the software is executed (by the processor 420) it is operable to perform operations described herein.

Figure 5:
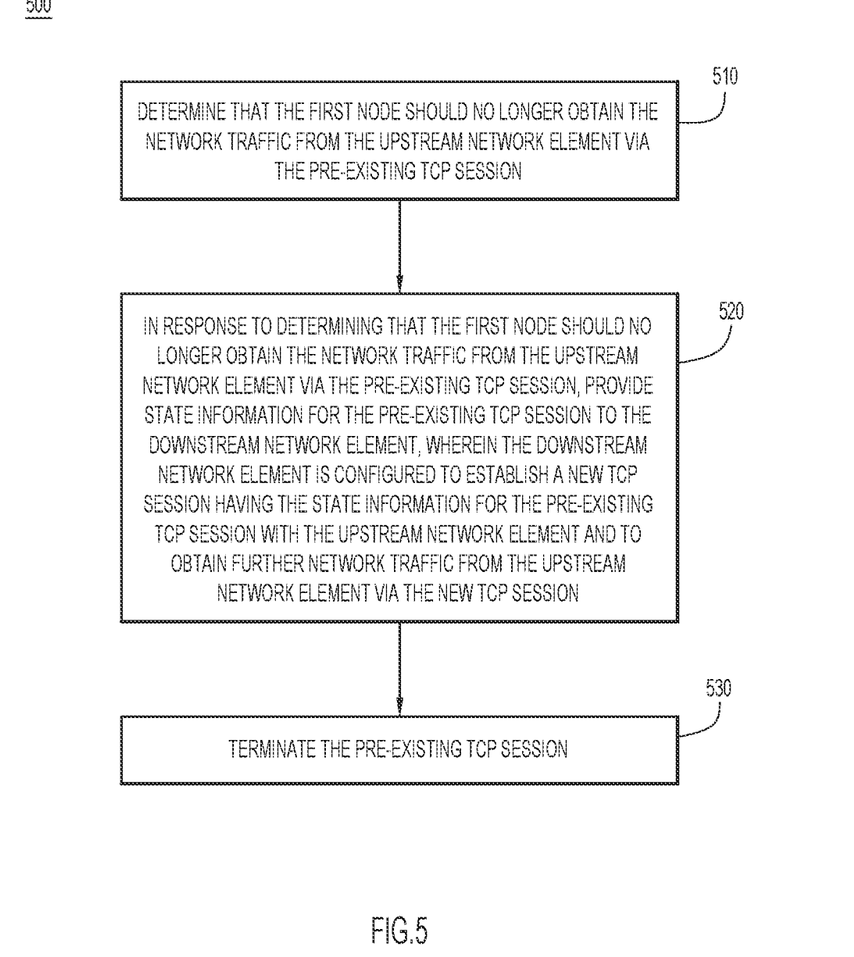
FIG. 5 is a flowchart of a method for TCP session mobility, according to an example embodiment.

FIG. 5 is a flowchart of an example method 500 for TCP session mobility. Method 500 may be performed at a first node (e.g., nodes 125(1) or 125(2)) in a service mesh. The first node may be configured to perform one or more services on network traffic obtained from an upstream network element (e.g., client device 105 or node 125(1)) via a pre-existing TCP session and provide the network traffic obtained from the upstream network element via the pre-existing TCP session to a downstream network element (e.g., node 125(2) or destination server 120). At 510, the first node determines that the first node should no longer obtain the network traffic from the upstream network element via the pre-existing TCP session.

At 520, in response to determining that the first node should no longer obtain the network traffic from the upstream network element via the pre-existing TCP session, the first node provides state information for the pre-existing TCP session to the downstream network element. The downstream network element may be configured to establish a new TCP session having the state information for the pre-existing TCP session with the upstream network element and to obtain further network traffic from the upstream network element via the new TCP session. At 530, the first node terminates the pre-existing TCP session.

Techniques described herein permit the server side of a TCP connection to be moved to another node, thus allowing an L7 proxy to remove the proxy from the middle of the TCP connection once the proxy has determined where the request should go. In this way, a proxy may ask the network to deliver the TCP connection to a new server, and the method described herein may ensure there is a properly prepared TCP stack on the new server to seamlessly deceive the client application.

In one form, a method is provided. The method comprises: at a first node in a service mesh, wherein the first node is configured to perform one or more services on network traffic obtained from an upstream network element via a pre-existing Transmission Control Protocol (TCP) session and provide the network traffic obtained from the upstream network element via the pre-existing TCP session to a downstream network element: determining that the first node should no longer obtain the network traffic from the upstream network element via the pre-existing TCP session; in response to determining that the first node should no longer obtain the network traffic from the upstream network element via the pre-existing TCP session, providing state information for the pre-existing TCP session to the downstream network element, wherein the downstream network element is configured to establish a new TCP session having the state information for the pre-existing TCP session with the upstream network element and to obtain further network traffic from the upstream network element via the new TCP session; and terminating the pre-existing TCP session.

In one example, the first node includes a virtual switch and one or more service proxies configured to perform the one or more services, and providing the state information for the pre-existing TCP session to the downstream network element includes providing the state information for the pre-existing TCP session to the downstream network element from the one or more service proxies, the method further comprising: at the first node: providing, from the one or more service proxies to the virtual switch, an indication to provide any of the network traffic obtained from the upstream network element via the pre-existing TCP session to the downstream network element before terminating the pre-existing TCP session.

In one example, the downstream network element is a second node in the service mesh, the second node includes a virtual switch and one or more service proxies configured to perform one or more services on the further network traffic obtained from the upstream network element via the new TCP session, and providing the state information for the pre-existing TCP session to the downstream network element includes providing the state information for the pre-existing TCP session to the virtual switch, wherein the virtual switch provides the state information for the pre-existing TCP session to the one or more service proxies.

In one example, the downstream network element is a destination server to which the further network traffic obtained from the upstream network element via the new TCP session are destined. In another example, the upstream network element is a client device, and the downstream network element provides, to a router configured to provide the network traffic obtained from the client device to the first node via the pre-existing TCP session, an indication to provide the network traffic obtained from the client device to the downstream network element via the new TCP session. In yet another example, the upstream network element is a second node in the service mesh.

The state information for the pre-existing TCP session may include a TCP sequence number and/or a TCP window size. In one example, providing the state information for the pre-existing TCP session includes providing the state information for the pre-existing TCP session as in-band information in one or more headers of the network traffic obtained from the upstream network element via the pre-existing TCP session.

In another form, a system is provided. The system comprises: an upstream network element; a downstream network element; and a first node in a service mesh configured to perform one or more services on network traffic obtained from the upstream network element via a pre-existing TCP session and provide the network traffic obtained from the upstream network element via the pre-existing TCP session to the downstream network element, wherein the first node is further configured to: determine that the first node should no longer obtain the network traffic from the upstream network element via the pre-existing TCP session; in response to determining that the first node should no longer obtain the network traffic from the upstream network element via the pre-existing TCP session, provide state information for the pre-existing TCP session to the downstream network element, wherein the downstream network element is configured to establish a new TCP session having the state information for the pre-existing TCP session with the upstream network element and to obtain further network traffic from the upstream network element via the new TCP session; and terminate the pre-existing TCP session.

In one example, the first node includes a virtual switch and one or more service proxies configured to perform the one or more services, and the first node is further configured to: provide the state information for the pre-existing TCP session to the downstream network element from the one or more service proxies; and provide, from the one or more service proxies to the virtual switch, an indication to provide any of the network traffic obtained from the upstream network element via the pre-existing TCP session to the downstream network element before terminating the pre-existing TCP session.

In one example, the downstream network element is a second node in the service mesh, the second node including a virtual switch and one or more service proxies configured to perform one or more services on the further network traffic obtained from the upstream network element via the new TCP session, and the first node is further configured to: provide the state information for the pre-existing TCP session to the downstream network element includes providing the state information for the pre-existing TCP session to the virtual switch, wherein the virtual switch provides the state information for the pre-existing TCP session to the one or more service proxies.

In one example, the downstream network element is a destination server to which the further network traffic obtained from the upstream network element via the new TCP session are destined. In another example, the upstream network element is a client device, and the downstream network element provides, to a router configured to provide the network traffic obtained from the client device to the first node via the pre-existing TCP session, an indication to provide the network traffic obtained from the client device to the downstream network element via the new TCP session. In yet another example, the upstream network element is a second node in the service mesh.

In another form, one or more non-transitory computer readable storage media are provided. The non-transitory computer readable storage media are encoded with instructions that, when executed by a processor of a first node in a service mesh, wherein the first node is configured to perform one or more services on network traffic obtained from an upstream network element via a pre-existing TCP session and provide the network traffic obtained from the upstream network element via the pre-existing TCP session to a downstream network element, cause the processor to: determine that the first node should no longer obtain the network traffic from the upstream network element via the pre-existing TCP session; in response to determining that the first node should no longer obtain the network traffic from the upstream network element via the pre-existing TCP session, provide state information for the pre-existing TCP session to the downstream network element, wherein the downstream network element is configured to establish a new TCP session having the state information for the pre-existing TCP session with the upstream network element and to obtain further network traffic from the upstream network element via the new TCP session; and terminate the pre-existing TCP session.

In one example, the first node includes a virtual switch and one or more service proxies configured to perform the one or more services, and the instructions further cause the processor to: provide the state information for the pre-existing TCP session to the downstream network element from the one or more service proxies; and provide, from the one or more service proxies to the virtual switch, an indication to provide any of the network traffic obtained from the upstream network element via the pre-existing TCP session to the downstream network element before terminating the pre-existing TCP session.

In one example, the downstream network element is a second node in the service mesh, the second node including a virtual switch and one or more service proxies configured to perform one or more services on the further network traffic obtained from the upstream network element via the new TCP session, and the instructions further cause the processor to: provide the state information for the pre-existing TCP session to the downstream network element includes providing the state information for the pre-existing TCP session to the virtual switch, wherein the virtual switch provides the state information for the pre-existing TCP session to the one or more service proxies.

In one example, the state information for the pre-existing TCP session includes a TCP sequence number and/or a TCP window size. In another example, the instructions further cause the processor to: provide the state information for the pre-existing TCP session as in-band information in one or more headers of the network traffic obtained from the upstream network element via the pre-existing TCP session.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
at a first node in a service mesh, wherein the first node is configured to perform one or more services on network traffic obtained from an upstream network element via a pre-existing Transmission Control Protocol (TCP) session and provide the network traffic obtained from the upstream network element via the pre-existing TCP session to a downstream network element:
　determining that the first node should no longer obtain the network traffic from the upstream network element via the pre-existing TCP session;
　in response to determining that the first node should no longer obtain the network traffic from the upstream network element via the pre-existing TCP session, providing state information for the pre-existing TCP session to the downstream network element, wherein the downstream network element is configured to establish a new TCP session having the state information for the pre-existing TCP session with the upstream network element and to obtain further network traffic from the upstream network element via the new TCP session; and
　terminating the pre-existing TCP session.

2. The method of claim 1, wherein the first node includes a virtual switch and one or more service proxies configured to perform the one or more services, and wherein:
　providing the state information for the pre-existing TCP session to the downstream network element includes providing the state information for the pre-existing TCP session to the downstream network element from the one or more service proxies, the method further comprising:
　at the first node:
　　providing, from the one or more service proxies to the virtual switch, an indication to provide any of the network traffic obtained from the upstream network element via the pre-existing TCP session to the downstream network element before terminating the pre-existing TCP session.

3. The method of claim 1, wherein the downstream network element is a second node in the service mesh, the second node including a virtual switch and one or more service proxies configured to perform one or more services on the further network traffic obtained from the upstream network element via the new TCP session, and wherein:
　providing the state information for the pre-existing TCP session to the downstream network element includes providing the state information for the pre-existing TCP session to the virtual switch, wherein the virtual switch provides the state information for the pre-existing TCP session to the one or more service proxies.

4. The method of claim 1, wherein the downstream network element is a destination server to which the further network traffic obtained from the upstream network element via the new TCP session is destined.

5. The method of claim 1, wherein the upstream network element is a client device, and wherein the downstream network element provides, to a router configured to provide the network traffic obtained from the client device to the first node via the pre-existing TCP session, an indication to provide the network traffic obtained from the client device to the downstream network element via the new TCP session.

6. The method of claim 1, wherein the upstream network element is a second node in the service mesh.

7. The method of claim 1, wherein the state information for the pre-existing TCP session includes a TCP sequence number.

8. The method of claim 1, wherein the state information for the pre-existing TCP session includes a TCP window size.

9. The method of claim 1, wherein providing the state information for the pre-existing TCP session includes providing the state information for the pre-existing TCP session as in-band information in one or more headers of the network traffic obtained from the upstream network element via the pre-existing TCP session.

10. A system comprising:
　an upstream network element;
　a downstream network element; and
　a first node in a service mesh configured to perform one or more services on network traffic obtained from the upstream network element via a pre-existing Transmission Control Protocol (TCP) session and provide the network traffic obtained from the upstream network element via the pre-existing TCP session to the downstream network element, wherein the first node is further configured to:
　　determine that the first node should no longer obtain the network traffic from the upstream network element via the pre-existing TCP session;
　　in response to determining that the first node should no longer obtain the network traffic from the upstream network element via the pre-existing TCP session, provide state information for the pre-existing TCP session to the downstream network element, wherein the downstream network element is configured to establish a new TCP session having the state information for the pre-existing TCP session with the upstream network element and to obtain further network traffic from the upstream network element via the new TCP session; and
　　terminate the pre-existing TCP session.

11. The system of claim 10, wherein the first node includes a virtual switch and one or more service proxies configured to perform the one or more services, and wherein the first node is further configured to:
　provide the state information for the pre-existing TCP session to the downstream network element from the one or more service proxies; and
　provide, from the one or more service proxies to the virtual switch, an indication to provide any of the network traffic obtained from the upstream network element via the pre-existing TCP session to the downstream network element before terminating the pre-existing TCP session.

12. The system of claim 10, wherein the downstream network element is a second node in the service mesh, the second node including a virtual switch and one or more service proxies configured to perform one or more services on the further network traffic obtained from the upstream network element via the new TCP session, and wherein the first node is further configured to:
　provide the state information for the pre-existing TCP session to the downstream network element includes providing the state information for the pre-existing TCP session to the virtual switch, wherein the virtual switch provides the state information for the pre-existing TCP session to the one or more service proxies.

13. The system of claim 10, wherein the downstream network element is a destination server to which the further network traffic obtained from the upstream network element via the new TCP session is destined.

14. The system of claim 10, wherein the upstream network element is a client device, and wherein the downstream network element provides, to a router configured to provide the network traffic obtained from the client device to the first node via the pre-existing TCP session, an indication to provide the network traffic obtained from the client device to the downstream network element via the new TCP session.

15. The system of claim 10, wherein the upstream network element is a second node in the service mesh.

16. One or more non-transitory computer readable storage media encoded with instructions that, when executed by a processor of a first node in a service mesh, wherein the first node is configured to perform one or more services on network traffic obtained from an upstream network element via a pre-existing Transmission Control Protocol (TCP) session and provide the network traffic obtained from the upstream network element via the pre-existing TCP session to a downstream network element, cause the processor to:
- determine that the first node should no longer obtain the network traffic from the upstream network element via the pre-existing TCP session;
- in response to determining that the first node should no longer obtain the network traffic from the upstream network element via the pre-existing TCP session, provide state information for the pre-existing TCP session to the downstream network element, wherein the downstream network element is configured to establish a new TCP session having the state information for the pre-existing TCP session with the upstream network element and to obtain further network traffic from the upstream network element via the new TCP session; and
- terminate the pre-existing TCP session.

17. The one or more non-transitory computer readable storage media of claim 16, wherein the first node includes a virtual switch and one or more service proxies configured to perform the one or more services, and wherein the instructions further cause the processor to:
- provide the state information for the pre-existing TCP session to the downstream network element from the one or more service proxies; and
- provide, from the one or more service proxies to the virtual switch, an indication to provide any of the network traffic obtained from the upstream network element via the pre-existing TCP session to the downstream network element before terminating the pre-existing TCP session.

18. The one or more non-transitory computer readable storage media of claim 16, wherein the downstream network element is a second node in the service mesh, the second node including a virtual switch and one or more service proxies configured to perform one or more services on the further network traffic obtained from the upstream network element via the new TCP session, and wherein the instructions further cause the processor to:
- provide the state information for the pre-existing TCP session to the downstream network element includes providing the state information for the pre-existing TCP session to the virtual switch, wherein the virtual switch provides the state information for the pre-existing TCP session to the one or more service proxies.

19. The one or more non-transitory computer readable storage media of claim 16, wherein the state information for the pre-existing TCP session includes a TCP sequence number or a TCP window size.

20. The one or more non-transitory computer readable storage media of claim 16, wherein the instructions further cause the processor to:
- provide the state information for the pre-existing TCP session as in-band information in one or more headers of the network traffic obtained from the upstream network element via the pre-existing TCP session.

* * * * *